United States Patent [19]

Watters et al.

[11] Patent Number: 5,238,632
[45] Date of Patent: Aug. 24, 1993

[54] CONTINUOUS FEED THERMOFORMING METHOD AND APPARATUS

[75] Inventors: Andrew J. Watters, East Malvern; John L. Waite, East St. Kilda, both of Australia

[73] Assignee: Hitek Limited, Victoria, Australia

[21] Appl. No.: 761,876

[22] PCT Filed: Apr. 3, 1990

[86] PCT No.: PCT/AU90/00125
§ 371 Date: Nov. 15, 1991
§ 102(e) Date: Nov. 15, 1991

[87] PCT Pub. No.: WO90/11881
PCT Pub. Date: Oct. 18, 1990

[30] Foreign Application Priority Data

Apr. 7, 1989 [AU] Australia .................. PJ3571
Oct. 30, 1989 [AU] Australia .................. PJ7135

[51] Int. Cl.⁵ .................. B29C 51/20; B29C 51/26
[52] U.S. Cl. .................. 264/151; 264/522;
264/280; 264/322; 425/296; 425/397; 425/400;
425/403.1
[58] Field of Search .................. 264/322, 40.7, 522,
264/550-552, 151, 210.1, 210.5, 210.2, 280;
425/253, 296, 324.1, 325, 326.1, 384, 403.1, 400,
397

[56] References Cited

U.S. PATENT DOCUMENTS 4,105,386  8/1978  Thiel et al. .
4,308,005  12/1981  Zundel .................. 425/302.1
4,459,093  7/1984  Asano .................. 425/297

FOREIGN PATENT DOCUMENTS 283284  9/1988  European Pat. Off. .
2059328  4/1981  United Kingdom .

*Primary Examiner*—Jill L. Heitbrink
*Attorney, Agent, or Firm*—Birch, Stewart, Kolasch & Birch

[57] ABSTRACT

A method for the operation of a thermoforming machine in which successive sections of a thermoforming web are formed includes the steps of continuously feeding a thermoformable web of plastics material into the entry of the thermoforming machine from an exit support roll of a substantially horizontal run portion of a conveyor, the exit support roll being movable forwardly in the direction of movement of the web and rearwardly in the opposite direction so as to respectively extend and retract the length of the horizontal run portion of the conveyor with the web flow speed at which the web is deposited initially on the conveyor and with the movement of vertically opposed male and female forming tools which are part of the thermoforming machine and which are able to advance and retract horizontally respectively in and against the web movement direction and to move vertically perpendicular to their horizontal movement.

13 Claims, 13 Drawing Sheets

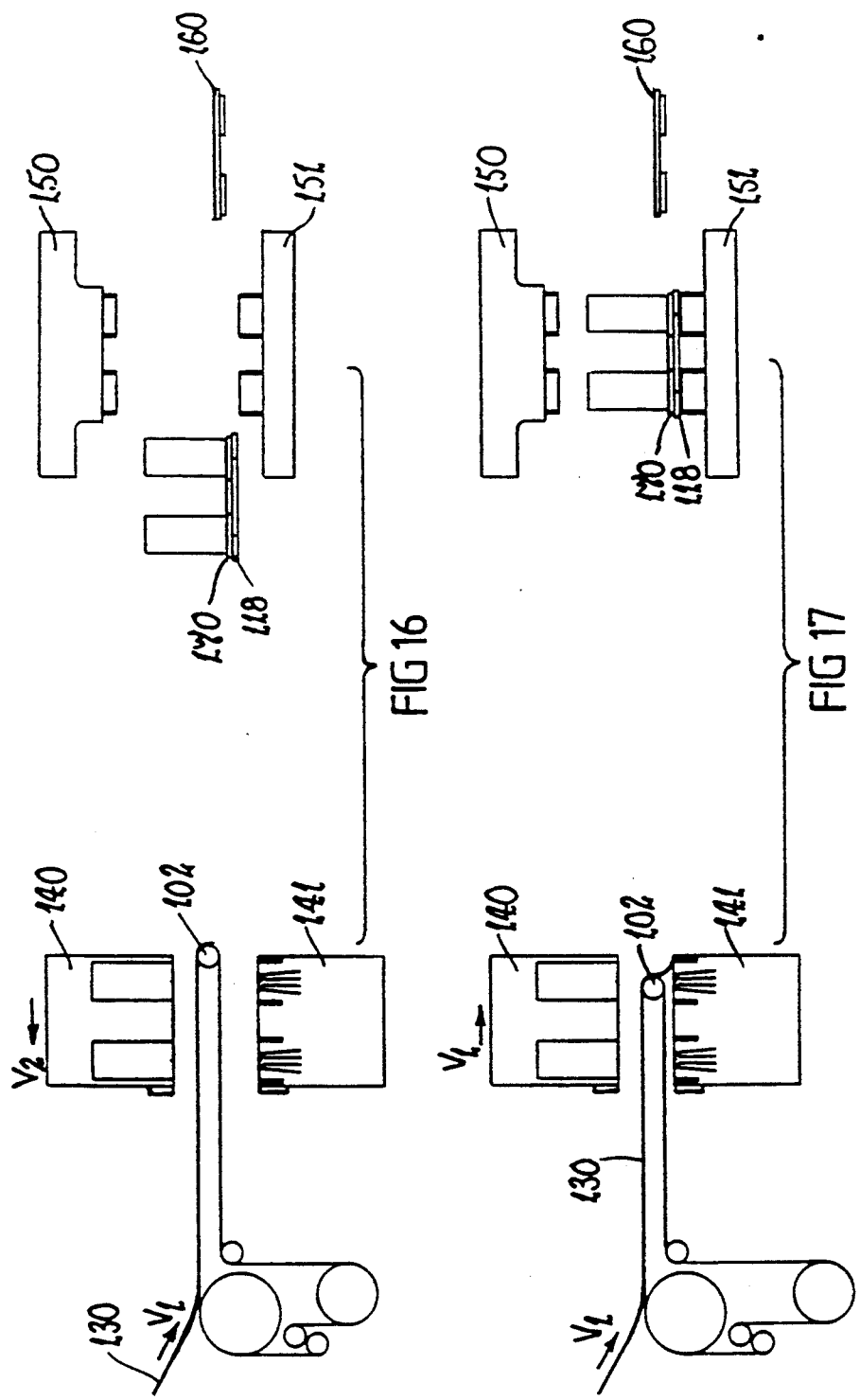

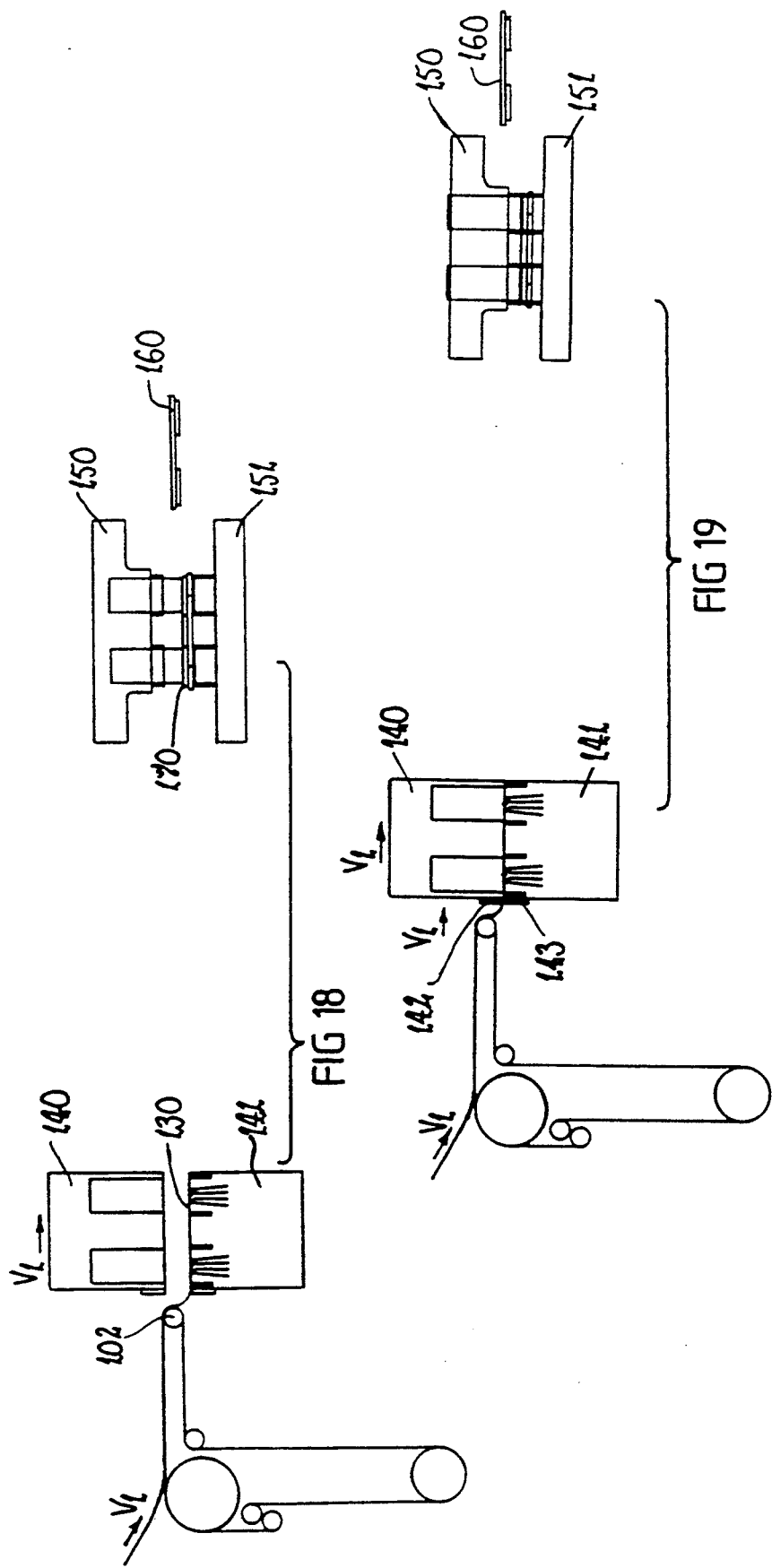

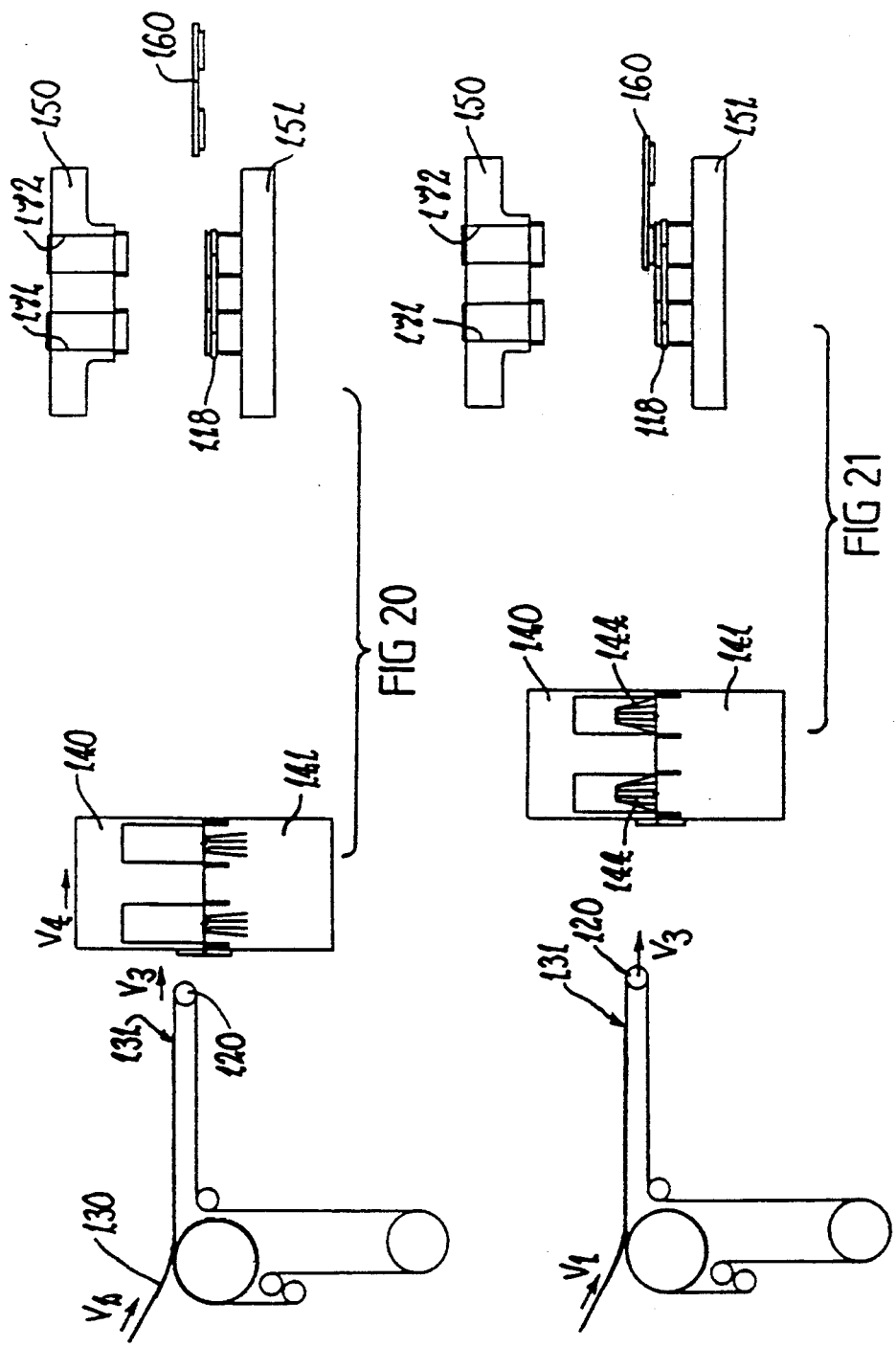

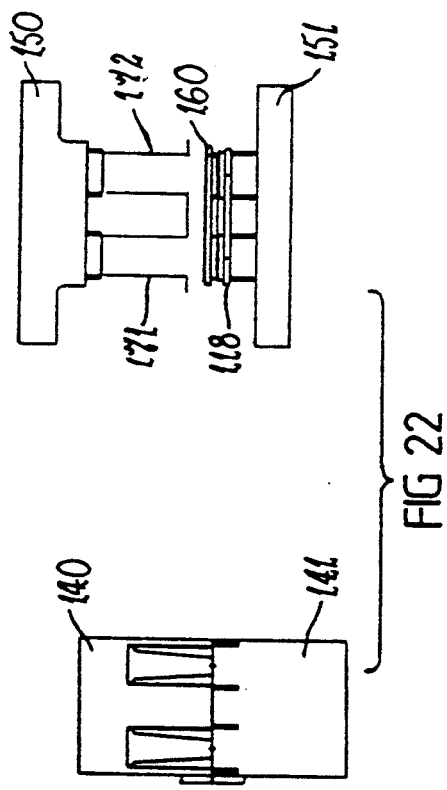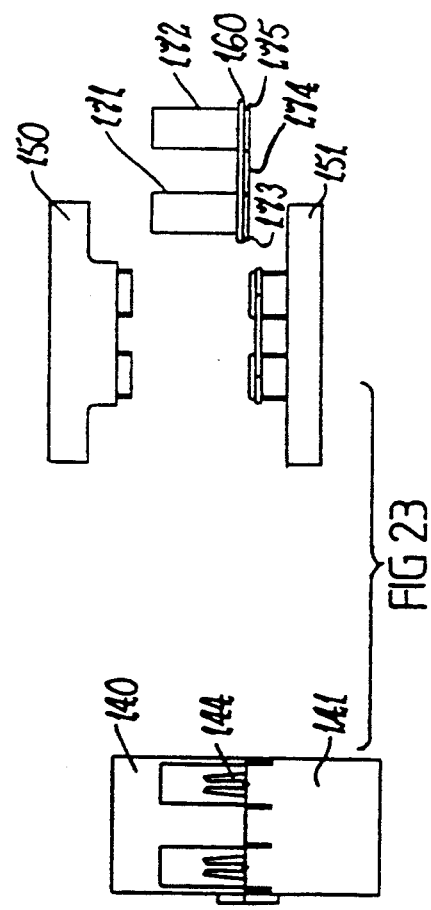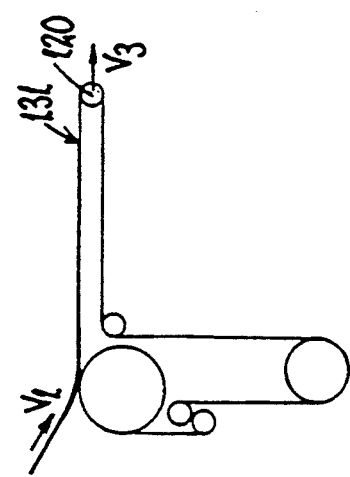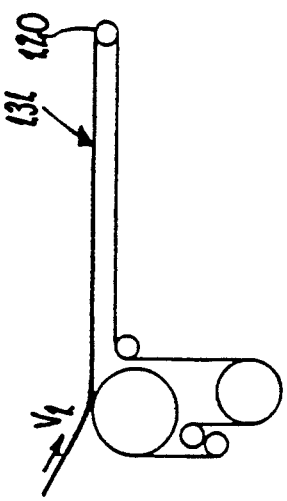
FIG 22
FIG 23

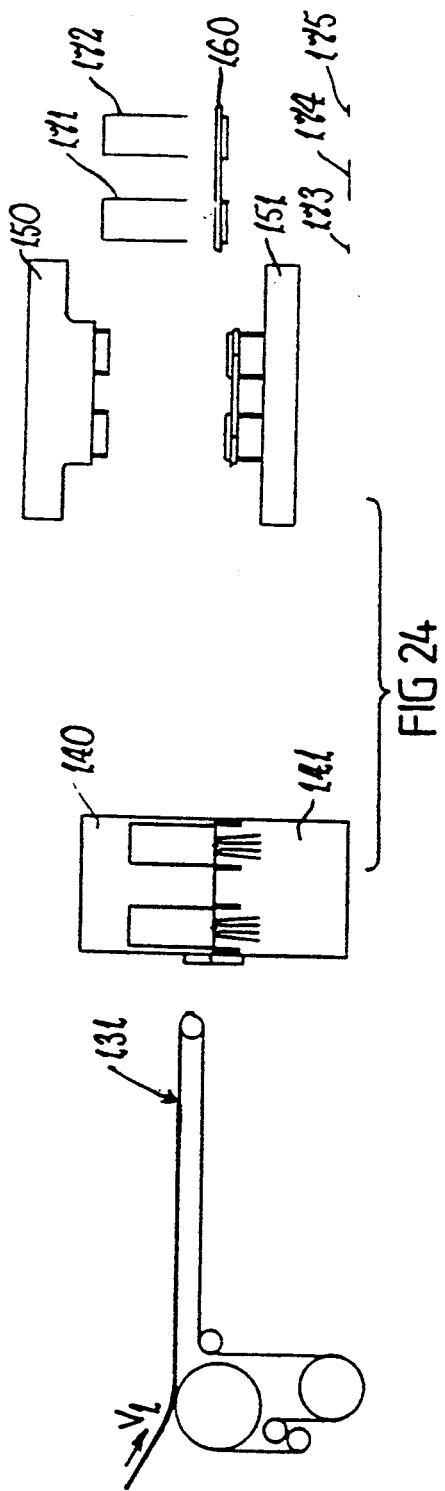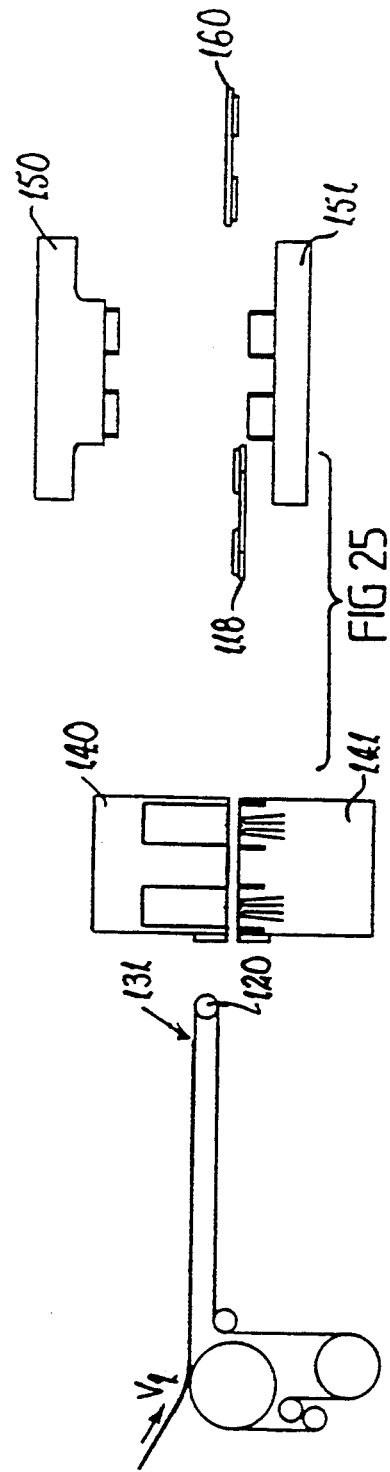

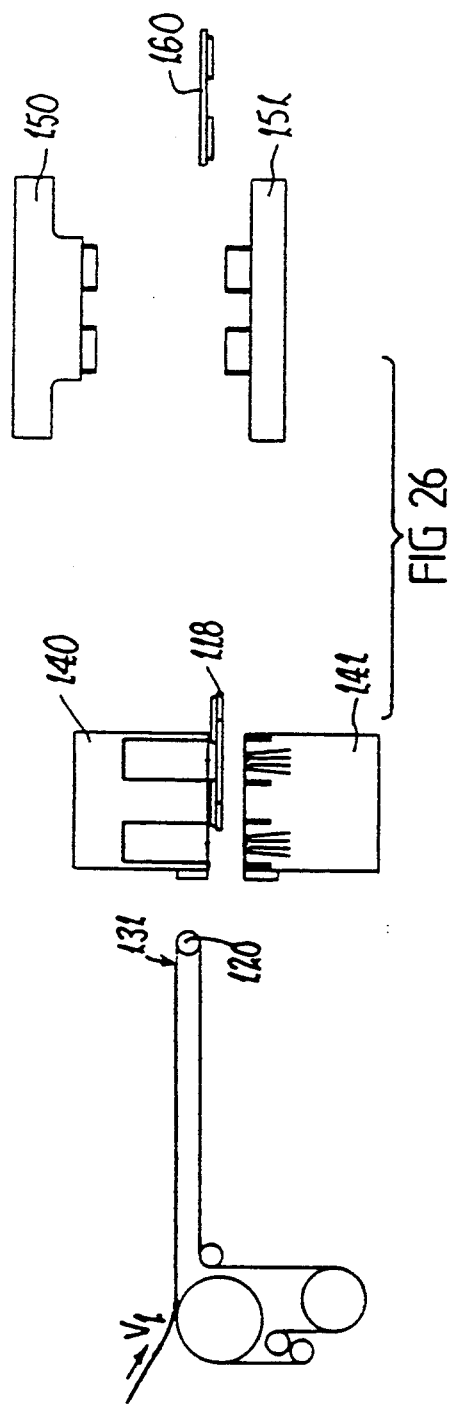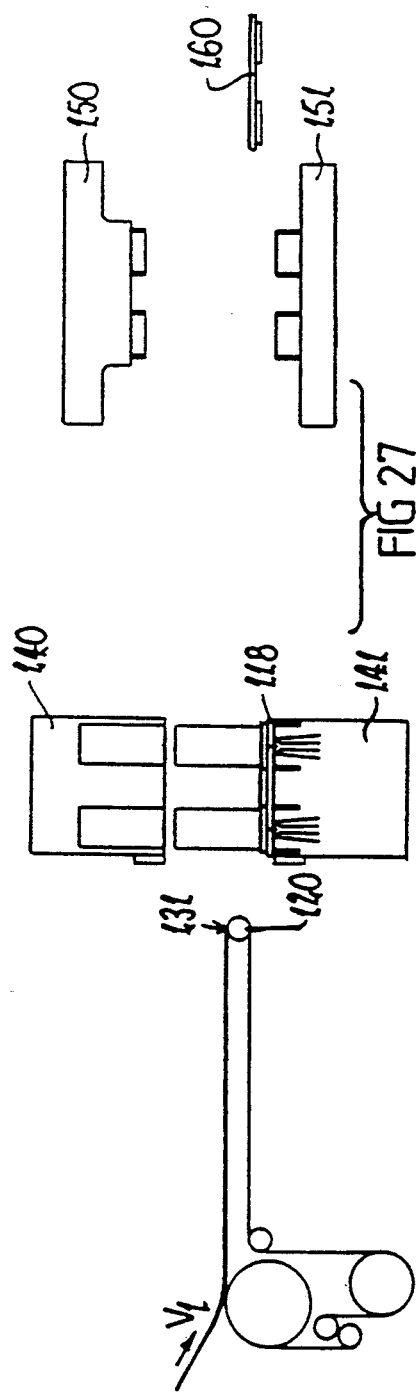

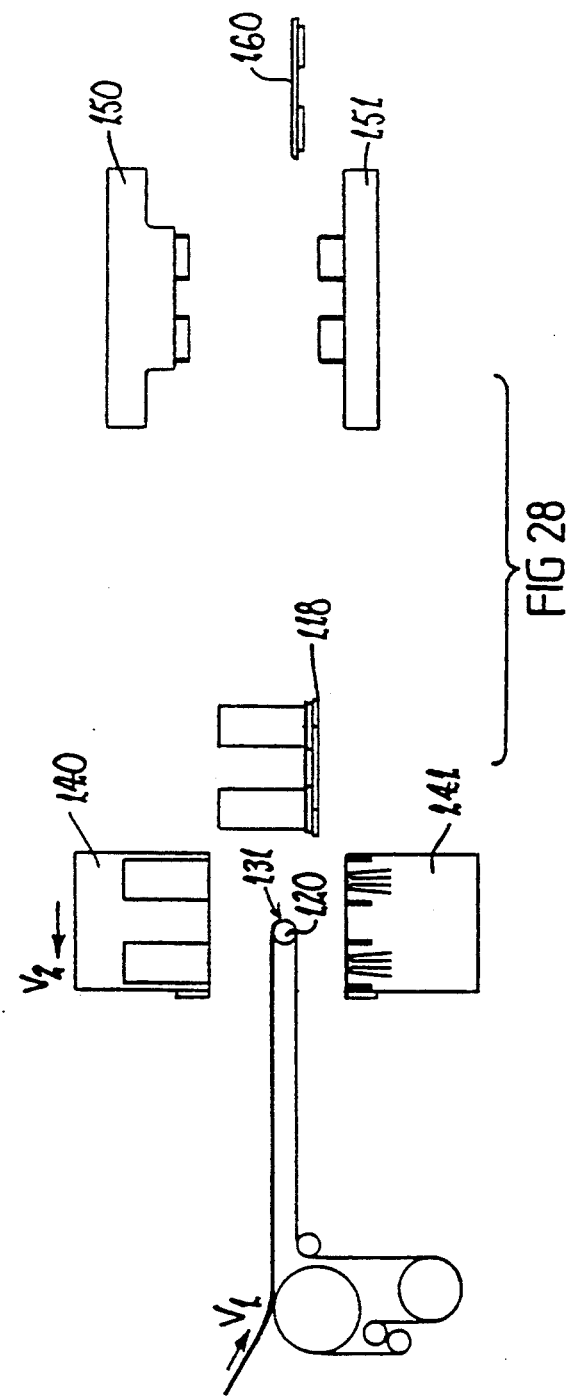

CONTINUOUS FEED THERMOFORMING METHOD AND APPARATUS

BACKGROUND OF THE INVENTION

1. Field of the Invention

This invention relates to a thermoforming method and apparatus which enables the continuous feeding and thermoforming of a web of thermoplastic material into parts produced intermittently by the thermoforming apparatus.

2. Description of Related Art

In our Australian patent application number 13236/88 we disclosed a method and apparatus whereby a heated web of thermoplastic material can be fed continuously into a intermittently operating thermoforming machine. In accordance with this disclosure, a partly cooled web is allowed to remain on a conveyor continuously feeding the web into the entry of a thermoformer, until the cooled surface layer of the web in contact with the conveyor has re-heated to a thermoformable temperature below that at which the web will stick to the conveyor. The disclosure of specification 13236/88 is hereby incorporated by reference into this specification.

Specification 13236/88 suggests various methods and combinations of apparatus by which the continuous feeding of the web can be reconciled with the intermittent operation of the thermoformer. In one such disclosure the conveyor feeds the web into the entry of a thermoformer having vertically opposed molding tools. The length of conveyor carrying the web is extendable and the conveyor exit support roller from which the web leaves the conveyor is extendable between the opposed faces of the molding tools. When the conveyor carrying the web has been fully extended between the opposed tool surfaces, the tool surfaces and the conveyor are moved forwardly in the material flow direction at the same speed while the upper mold tool is lowered onto the hot web and vacuum is applied to engage the web and remove it from the conveyor. After removal of the web from the conveyor surface, the conveyor is retracted and the mold tools are closed to form the required parts from the web. However, forward movement of the web and the mold tools continues without interruption and the exit support roller of the conveyor follows the closed mold tools until forming and cooling has taken place. The mold tools are then separated and the web with the formed parts is ejected from the upper mold tool. The lower mold tool is moved to a position below the conveyor during ejection of the formed web and the upper and lower mold tools then return for the cycle of operations to recommence. The tools may move together or sequentially.

The removal of the web from the conveyor to the upper mold tool by applied vacuum is difficult to execute and may restrict the overall utility of the apparatus because of problems associated with suction plate design and vacuum control required to cope with a melt phase thermoplastic web. It is therefore an object of the present invention to provide an improved thermoforming method and apparatus enabling continuous feeding of a thermoformable web to a thermoformer in which the molding operations occur intermittently.

SUMMARY OF THE INVENTION

Accordingly the present invention provides a method for the operation of a thermoforming machine in which successive sections of a thermoforming web are formed, the method including continuously feeding a thermoformable web of plastics material into the entry of the thermoforming machine from an exit support roll of a substantially horizontal run portion of a conveyor, the exit support roll being movable forwardly in the direction of movement of the web and rearwardly in the opposite direction so as to respectively extend and retract the length of the horizontal run portion of the conveyor available to support the web, and synchronizing the movement of the conveyor with the web flow speed at which the web is deposited initially on the conveyor and with the movement of vertically opposed male and female forming tools which are part of the thermoforming machine and which are able to advance and retract horizontally respectively in and against the web movement direction and to move vertically perpendicular to their horizontal movement, characterised in that the exit support roll is retracted from a position at the forward end of the lower forming tool so as to deposit the web on the lower forming tool as the said tool is moved forward at the web flow speed, the exit support roll and the lower forming tool are then moved forward at the web flow speed while the upper forming tool, also moving at the web flow speed, is brought into registry with the web and lower forming tool, the web is formed and cooled within the forming tools, the tools are then separated vertically and at least the lower tool is retracted.

This invention also provides a thermoforming system including a conveyor for continuously feeding thermoformable web, a thermoforming machine having vertically opposed male and female forming tools which are able to advance and retract respectively in and against the direction of movement of the web through the machine and to move vertically perpendicular to their horizontal movement, an exit support roll terminating a substantially horizontal run portion of the conveyor and movable forwardly in the web movement direction and rearwardly in the opposite direction so as to respectively extend and retract the length of the substantially horizontal run portion of the conveyor available to support the web, characterised in that the conveyor can be retracted from a position between the forming tools so as to deposit web extending rearwardly from the horizontal run portion on the upper surface of the lower forming tool, and the forming tools can be brought into registry after retraction of the conveyor from between them to form the deposited web.

In accordance with the present invention, a web of thermoplastics material is carried by a conveyor which moves web deposited on the conveyor forwardly towards the exit end of the conveyor where the material of the conveyor passes over an exit support roll. The conveyor is preferably in the form of a continuous belt of appropriate material which passes around a roll assembly. The conveyor material path around the roll assembly includes a substantially horizontal run portion on which the web is deposited. The horizontal run portion terminates on the exit support roll and is extendable by movement of the exit support roll in the forward direction of movement of the web. The exit support roll is also retractable so that the length of conveyor material in the horizontal run portion available to support the web is reduced.

The exit support roll of the conveyor is located adjacent the entry of a thermoformer which includes vertically opposed upper and lower forming tool carriages, one of which carries a female thermoforming mold tool while the other carries a male thermoforming tool. The tool carriages are adapted for forward advancement in the web flow direction away from the conveyor roll assembly and for retraction against the web flow direction back towards the roll assembly. The forming tool carriages are also adapted for vertical movement to separate the upper and lower tool carriages or to bring the carriages together for the molding operation.

In accordance with the invention the conveyor carrying the unformed web is extended above the lower tool carriage with the exit support roll at the forward end of this carriage and is then retracted to deposit the web leaving its exit end, on the lower tool. The speed of conveyor material around the roll assembly is synchronized with the speed at which the web is deposited initially on the conveyor (hereinafter called the web flow speed). In addition, the speed of forward movement of the exit support roll to extend the length of the conveyor horizontal run portion is synchronized with the web flow speed for at least part of the machine operation cycle. As the web is deposited from the exit support roll of the conveyor, the lower tool carriage is also moved forward at the web flow speed.

It will be appreciated that the upper and lower tool carriages must be separated to allow extension of the conveyor above the lower tool. The separation of the respective tool carriages may be a vertical separation sufficient to allow the conveyor to extend between them. Alternatively, the respective tool carriages can be separated horizontally so that the forward end of the lower tool carriage is offset from the rearward end of the upper tool carriage in order to allow removal of the formed parts and scrap.

When the web has been fully deposited on the lower tool, the conveyor exit support roll and the lower tool carriage move forward at the web flow speed while the upper tool, also moving forward at the web flow speed, is brought into registry with the web and lower tool. Molding and then cooling of the web take place within the forming tools.

It should be appreciated that when reference is made to the conveyor exit support roll moving forward or being retracted, the movement of the conveyor in the horizontal direction is restricted to the exit support roll and the material of the conveyor in the horizontal run portion which extends horizontally from the exit support roll back towards the area of the conveyor material onto which the web coming from the extruder or reheater is fed. The other rolls of the conveyor roll assembly do not move. It is therefore to be understood that references hereinafter to movement of "the conveyor" refer to movement of the exit support roll and the horizontal run portion of the conveyor material (and supports associated with the exit support roll) only.

The movement necessary to bring the upper tool into registry with the lower tool depends on the way in which the respective tools are separated while the web is deposited on the lower tool. If the tools are separated vertically, the upper tool can simply be moved vertically into registry with the lower tool for the molding step. If the tools have been separated horizontally, it is necessary to raise the tool, retract it into vertical alignment with the lower tool, and then lower it into registry.

When the molding stage has been completed, the tools are separated vertically, and at least the lower tool is retracted. The upper tool may continue to move forwardly at the web flow speed with the conveyor or both lower and upper tools may be retracted together. When at least the lower tool has been retracted, the cycle of operations can recommence with the web being deposited on the lower tool.

The movement of the conveyor and the upper tool after the vertical separation of the tools will depend on the situation with the web. Thus, the web may be severed to separate the incoming unformed web from a section of web to be formed. The severance of the web can be done at any point although it is preferably done adjacent to the exit support roll of the conveyor or on the other side of the forming tool (that is, after forming). The web is preferably severed adjacent to the conveyor as this provides for the unformed web to be "stored" on the conveyor by allowing extension of both the forming tools and the exit support roll forwardly more rapidly than the web flow speed. This allows the cut edge of the stored web to be kept in a position away from steady or prolonged contact with that point of the conveyor belt directly in contact with the exit support roll. Such prolonged contact may cause heat loss and diminished quality of forming of a section of the web.

Preferably the web is severed after the forming tools are brought into registry. Forming and cooling of the separated section of the web is then allowed to take place in the forming tools prior to their vertical separation and retraction together.

A further feature of the present invention is the provision of trimming tools located in line after the forming tools and synchronized to cooperate with the movements of the conveyor and forming tools. Thus, the synchronization of the conveyor and forming tools which is a primary feature of the present invention can be further enhanced by the synchronization with these components of trimming tools thereby providing a method which reduces the time needed to produce the final products and also providing a single relatively compact machine which will enable rapid production of the desired thermoformed articles.

A further feature of this invention is the degree of control provided during the transfer of the formed web from the forming tool to the trim tool. This control reduces the amount of mechanical force which may be imposed upon the web and therefore permits the continued processing, for example trimming, of a web where the web structure may still be partially molten and not capable of withstanding the forces imposed by normal transfer methods.

Difficulty may be experienced in aligning the formed web with the trim tools. One cause of possible difficulty is the significant shrinkage typical of plastic polymers when cooled as part of the forming process. This shrinkage continues as a function of time and temperature as the cooling continues and affects not only the dimensions of the formed part but also the spacing of one part from the next in a sheet in which multiple parts are formed. Difficulties may also be experienced in accurately placing formed parts at high speed into trimming tools when multiple parts are formed in a single sheet.

In accordance with the present invention, the web transfer member includes locating means which are preferably complementary to features formed in the web. The formed web and the web transfer member are brought together in such a way that the complementary locating means and features are placed in functional relationship so as to accurately position the formed web on the web transfer member. The web transfer member can then be transferred to the trim tool while retaining the formed web in its accurate location so that a trim tool may be closed on the sheet without any requirement for re-positioning of the sheet to ensure accurate trimming of the formed part from the web.

Preferably special locating features are formed into the web. The locating features may be formed into the web as the desired end products are also formed. The special locating features may, but need not, be part of the desired final product and are, as indicated above, formed to mate with complementary features in the transfer member.

To assist a further understanding of the present invention several examples of methods and apparatus operating in accordance with the invention will now be described. It should be appreciated that these detailed examples are given by way of illustration only and are not to be construed as limiting the scope of the invention described above.

BRIEF DESCRIPTION OF THE DRAWINGS

To assist in describing the specific examples, reference is made to the accompanying drawings in which:

FIGS. 16 to 28 are schematic representations showing successive stages of the method and of the positions occupied by the apparatus of Example 7.

DETAILED DESCRIPTION OF PREFERRED EMBODIMENTS

EXAMPLE 1

Figure 1:
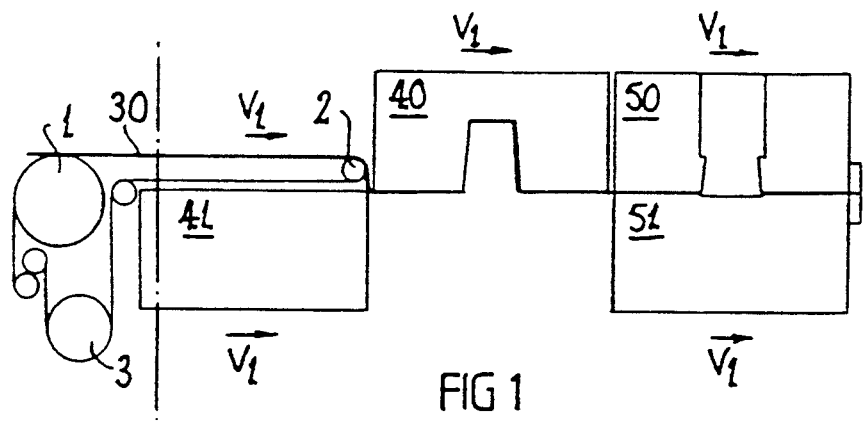
FIGS. 1 to 12 are schematic representations showing successive stages of the method and of the positions occupied by the apparatus of Example 5.

A machine is provided in which a web of thermoplastics material can be fed onto the upper surface of a horizontally extending conveyor belt. The conveyor roll assembly includes a horizontally movable exit support roll and the web fed onto the conveyor belt is carried by the horizontal portion of the belt to the exit support roll. The exit support roll leads the web carried by the conveyor onto the upper surface of the male forming tool. A female forming tool designed for cooperation with the male forming tool is adapted to move horizontally or vertically of the machine direction, independently of the male tool.

In operation, the male and female tools are separated horizontally with the forward end of the male tool offset from the rearward end of the female tool and with the respective upper and lower faces of these tools aligned. The exit support roll of the conveyor is advanced so that the conveyor extends fully over the upper surface of the lower male tool. The conveyor is retracted rapidly relative to the web flow speed and to the speed of forward movement of the male and female tools which is synchronized with the web flow speed as the conveyor is retracted. The web is thus deposited on the upper surface of the lower tool as the conveyor retracts horizontally.

When the web covers the lower tool, the conveyor and the lower tool both move forward at the web flow speed while the upper tool is raised vertically and then retracted horizontally. When the upper tool is vertically aligned with the lower tool it is lowered into registry with the tool and molding and cooling takes place with the conveyor and both tools moving forward, all at the web flow speed. When molding is completed, the tools are separated vertically and the upper tool continues forward with the conveyor and the formed web at the web flow speed while the lower tool is retracted horizontally.

EXAMPLE 2

A similar machine to that described in Example 1 is formed but in this machine the male and female forming tools are coupled in their horizontal movement but move independently in their vertical movement. Web is fed from the conveyor onto the surface of the lower forming tool moving forwardly at the web flow speed by retracting the extended conveyor after the upper and lower tools have been separated vertically. When the web covers the lower tool, the conveyor and the upper and lower tools are moved forwardly, all at the web flow speed, while the upper tool is lowered into registry with the lower tool. Molding and cooling operations take place with the conveyor and both tools moving forward at the web flow speed. When molding has been completed, the tools are separated vertically, and the conveyor continues forward at the web flow speed while both tools are retracted together.

EXAMPLE 3

In this Example the conveyor and forming tools are as described for Example 1 but upper and lower trimming tools are added to follow directly in line after the forming tools. The trimming tools consist of a lower punch trim tool and an upper anvil trim tool. The trim tools are able to move independently of each other in the vertical direction but are coupled in both the horizontal and vertical directions with the movement of the forming tools. These additional tools increase the cooling time for the web and allow for trimming to occur outside of the forming mold but in a continuous manner with the forming operation.

In the machine of this Example, the lower punch trim tool supports the web with the previously formed part as laying of the web from the conveyor onto the lower forming tool commences. As laying of the web onto the forming tool proceeds, all the tools are moved forwardly in the machine direction at the web flow speed. After the web has covered the lower forming tool, the synchronized forward movement of the tools continues as the upper tools are lowered over their respective forming and trim lower tools. As molding proceeds in the forming tools, the previously formed part and scrap are severed from the web and the previously formed part is expelled from the anvil trim tool. When molding is completed, the tools are separated vertically and the lower tools are retracted as the web is moved forward unsupported by forming or trimming tools. When tool retraction is complete, the lower tools are raised to support the web.

EXAMPLE 4

The machine of this Example is similar to that of Example 3 but in this case the respective forming and trimming tools are coupled in their horizontal motion but move independently of their male or female counterparts in vertical motion. As laying of the web on the lower forming tool is started, the lower trim tool moves forwardly with the lower forming tool at the web flow speed and supports the web carrying the previously formed part. As laying of the web proceeds, the forward movement of the lower tools continues and the upper forming tool is raised from the previously formed part and retracted with the upper trim tool.

The upper forming tool is lowered onto the web after the lower forming tool is covered and as molding proceeds in the forming tools, the upper trim tool is lowered over the previously formed part and the punch trim tool is operated to sever the previously formed part and any scrap from the web and to expel the previously formed part from the anvil trim tool. The upper tools are moved forward at the web flow speed as they are lowered and as they cooperate with their respective lower tools in the forming and trimming operations.

The lower forming and trim tools are lowered together when molding is completed and are retracted together with the upper tools while forward motion of the upper tools continues at the web flow speed. The lower tools are then raised together and moved forwardly at the web flow speed for the deposition of the web from the conveyor and to further support the previously formed part.

EXAMPLE 5

This Example also describes a machine which has similar components to that of Example 3. However, in this Example the movement of the respective forming and trimming tools is arranged so that the plastic web is held captive throughout the forming and trimming operations. This allows the punch trim tool to position into the previously formed part while it is held in the forming tool cavity. The punch trim tool is then very easily and accurately positioned in relation to the web and part.

As this is the most complex Example described to this point, the accompanying schematic drawings are provided to assist in an expanded description and to further assist an understanding of the present invention as described above. FIGS. 1 to 12 illustrate the major steps in the method and in the movement of the various components of the apparatus as described in detail below. It should be appreciated that the steps shown in FIGS. 1 to 12 follow in sequence but that the time interval between the illustrated steps is greater between some steps than between others.

In FIG. 1 the conveyor roll assembly is illustrated at the left-hand side of the figure and includes a driving roll 1 which drives the continuous belt of conveyor material over the remaining rolls of the conveyor roll assembly at a constant speed $V_1$ throughout the operation of the process or machine. The speed $V_1$ corresponds to the web flow speed at which the web 30 is fed onto the upper surface of the conveyor between driving roll 1 and exit support roll 2. The conveyor roll assembly further includes take up roller 3 which is raised and lowered in accordance with the movement of exit support roll 2 so as to maintain a constant tension in the conveyor material.

In FIG. 1 the lower male forming tool 41 is in its retracted position adjacent the conveyor roll assembly and the upper female forming tool 40 is spaced horizontally forward of the forward end of tool 41. Trim tools 50 and 51 are spaced horizontally forward of forming tool 40 and all four tools are about to commence moving forwardly at speed $V_1$.

Figure 2:
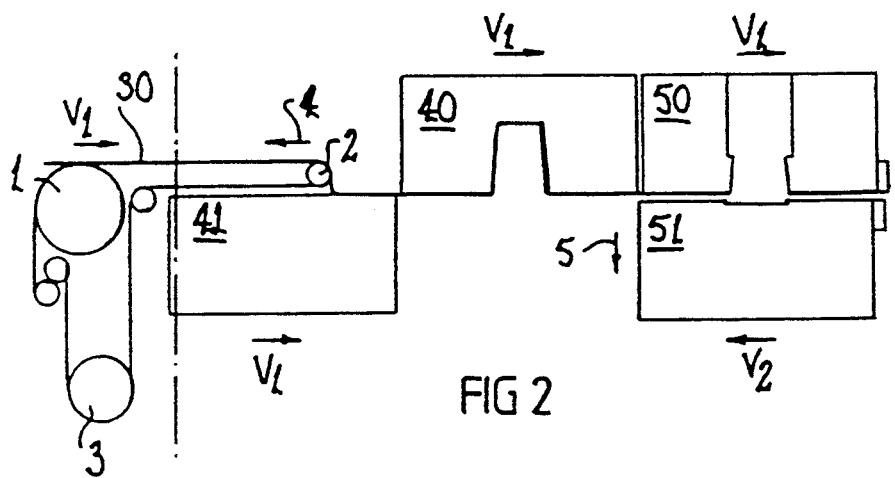

In FIG. 2, exit support roll 2 is being retracted as indicated by arrow 4 and web is being deposited on the upper surface of forming tool 41. Forming tool 41 is continuing to move forward at velocity $V_1$ as are forming tool 40 and trim tool 50. (Note the movement of 41 relative to the datum line shown vertically in broken lines.) Trim tool 51 has been moved downwardly as indicated by arrow 5 and is starting retraction at speed $V_2$.

Figure 3:
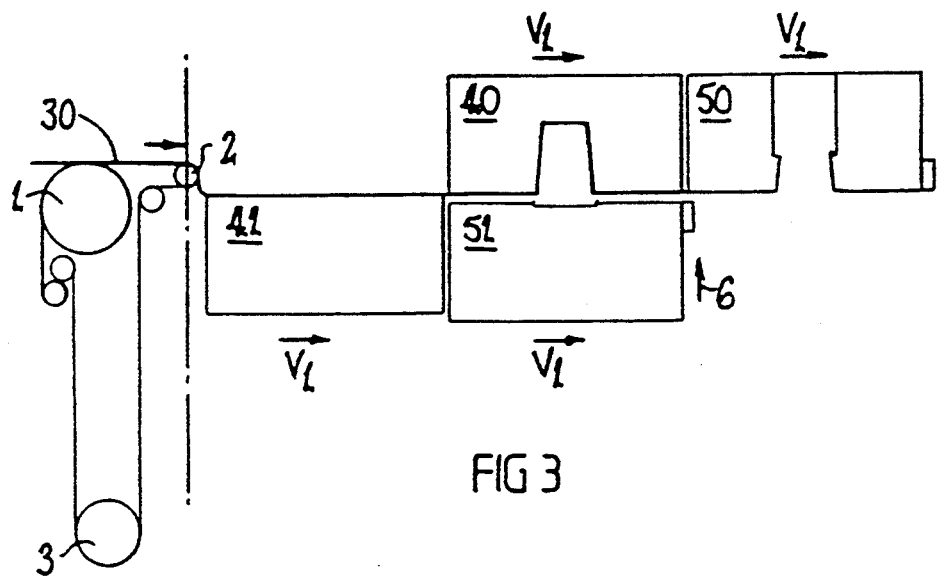

In FIG. 3, exit support roll 2 is fully retracted and has completed depositing the web on the upper surface of forming tool 41. The retraction of trim tool 51 has been completed and this tool is about to rise into registry with forming tool 40 as indicated by arrow 6 to further support the already formed web. Exit support roll 2 has commenced moving forward again at speed $V_1$ to maintain its relative position to forming tool 41.

Figure 4:
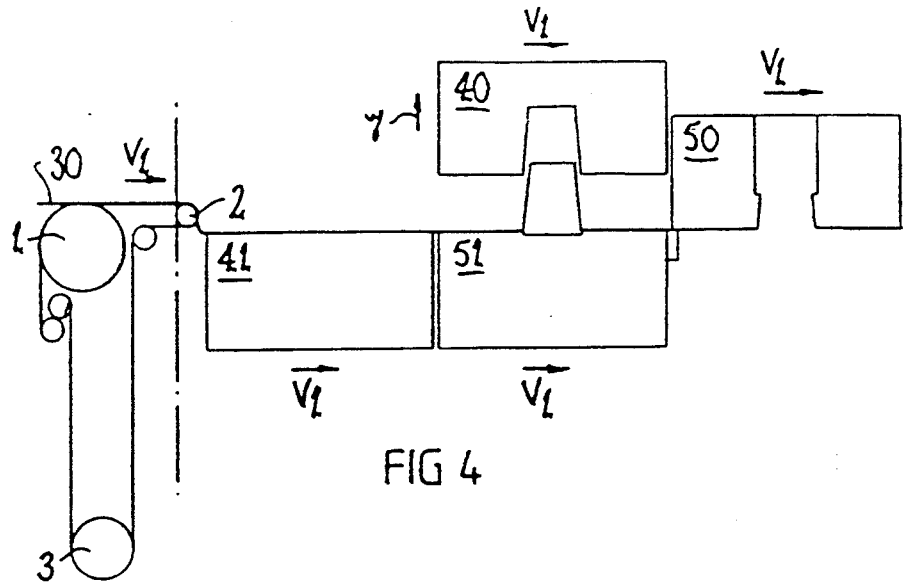

In FIG. 4, the conveyor and all four forming tools are moving forwardly at speed $V_1$ as forming tool 40 is raised above the formed web as indicated by arrow 7. The formed web remains on lower trim tool 51 which has moved into its uppermost vertical position.

Figure 5:
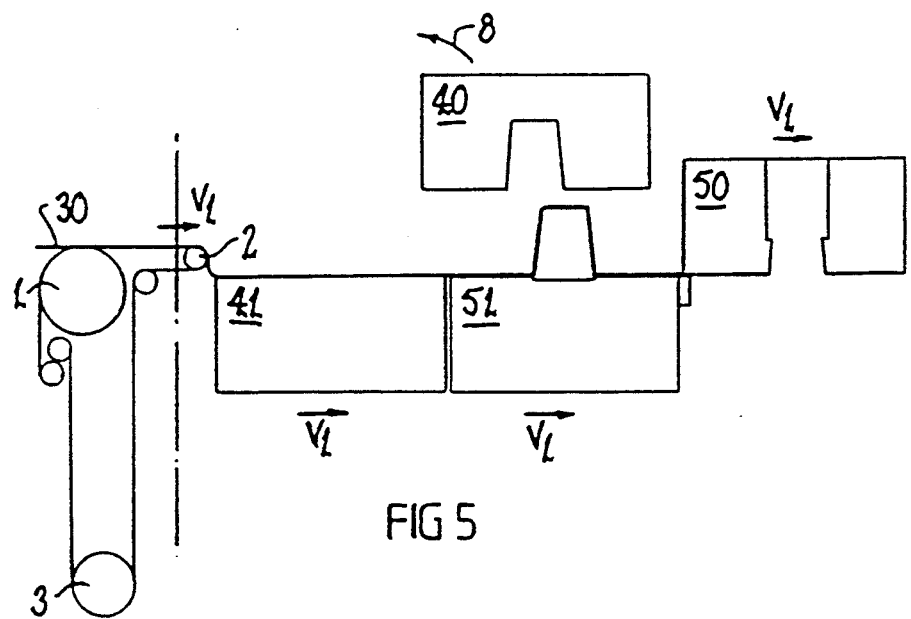

In FIG. 5, upper forming tool 40 has moved upwardly and rearwardly as indicated by arrow 8 while the conveyor and the remaining tools continue to move forwardly at speed $V_1$.

Figure 6:
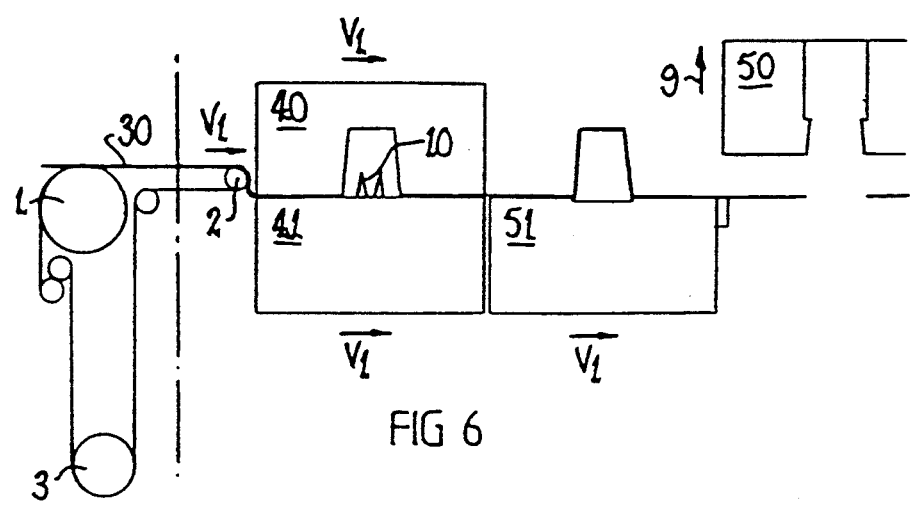

In FIG. 6, forming tool 40 has been fully retracted and lowered into registry with forming tool 41 and the molding of the web by male tools 10 has commenced. (For simplicity, the shaping of the web by tools 10 is not shown in this Figure or in the succeeding intermediate molding step Figures.) Upper trim tool 50 is moving upwardly as indicated by arrow 9. The conveyor and the remaining tools 40, 41 and 51 continue to move forwardly at speed $V_1$.

Figure 7:
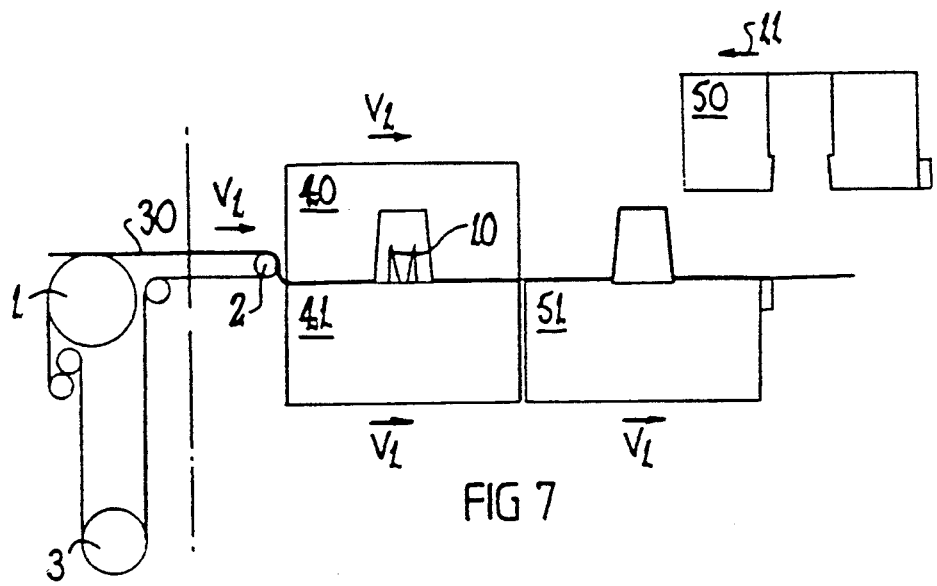

In FIG. 7, molding is continuing as tools 10 move upwardly from forming tool 41 into forming tool 40 as the forward movement of the conveyor, forming tools 40 and 41 and trim tool 51 at speed $V_1$ continues. Forming tool 50 is moved rearwardly as indicated by arrow 11.

Figure 8:
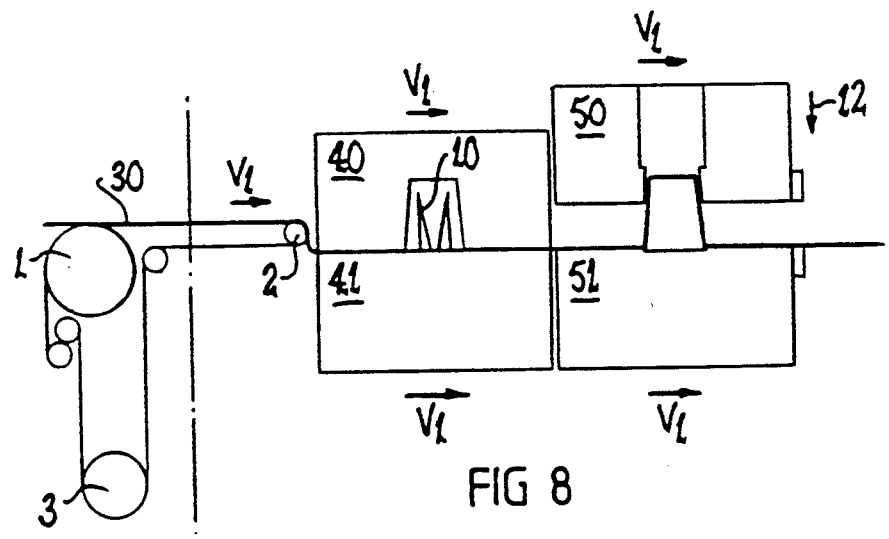

In FIG. 8, the conveyor and all forming and trim tools are moving forwardly at speed $V_1$ while trim tool 50 is lowered as indicated by arrow 12 over the previously formed part.

Figure 9:
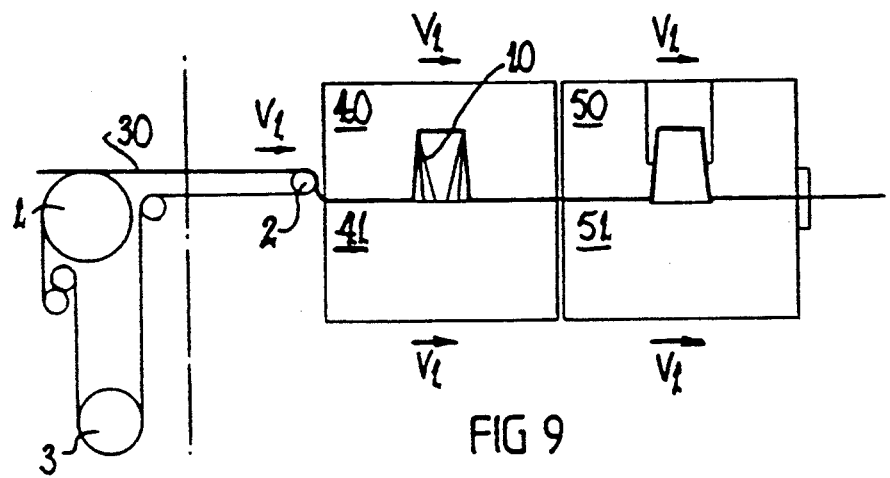

In FIG. 9, molding has been completed in forming tools 40 and 41 and trim tools 50 and 51 are now closed on the previously formed web.

Figure 10:
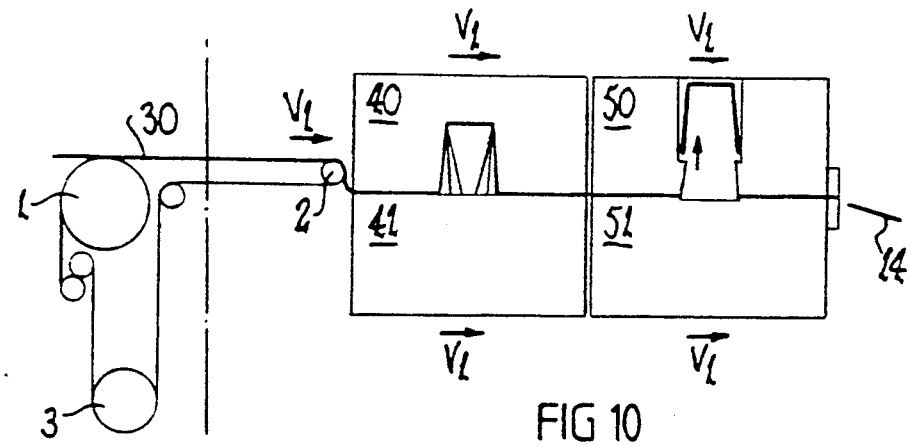

In FIG. 10, the punch of trim tool 51 has been actuated to sever the formed part from the web as indicated by arrow 13 and to remove scrap 14. The forward movement at speed $V_1$ of the conveyor and all forming and trim tools continues. Cooling of the newly formed part in forming tools 40 and 41 continues also.

Figure 11:
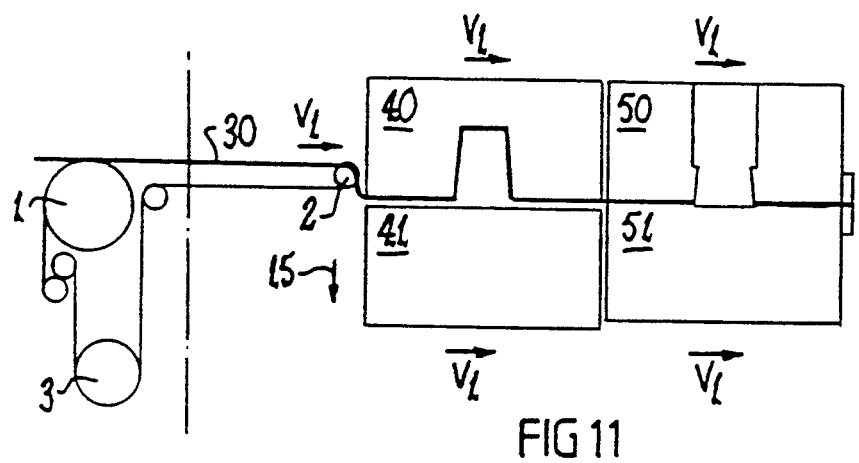

In FIG. 11, the lower forming tool 41 has been lowered as indicated by arrow 15 while forward movement of the conveyor, both forming tools and both trim tools at speed $V_1$ continues.

Figure 12:
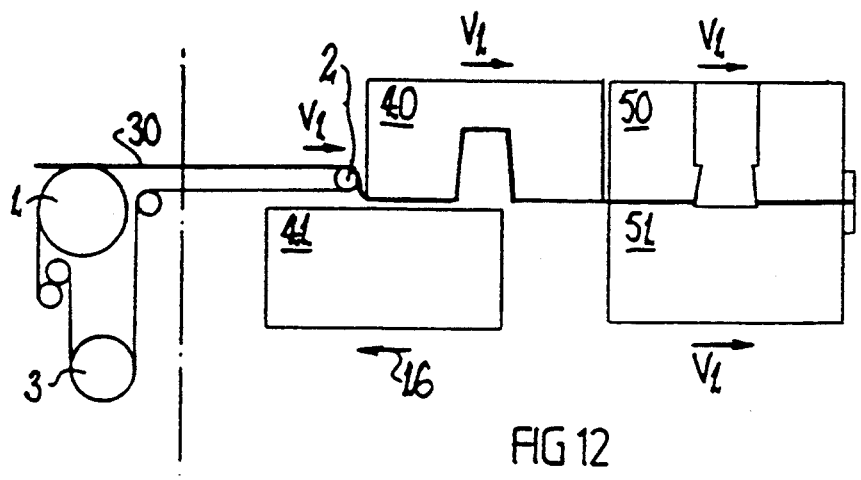

In FIG. 12, forward movement of the conveyor, of forming tool 40 and of trim tools 50 and 51 at speed $V_1$ continues while forming tool 41 is returned as indicated by arrow 16. As the return movement of forming tool 41 is completed, the position illustrated in FIG. 1 is reached and the cycle of operations recommences.

EXAMPLE 6

The machine of this Example is most similar to that of Example 3. However, in this Example the respective upper and lower parts of the forming and trimming tools are movable independently of each other in the vertical direction but are coupled for movement in the horizontal direction.

The forming tools, as a pair, and the trimming tools, as a pair, move in a synchronized manner to obtain the correct speed and position relationships with the web in order to perform the forming and trimming functions as for the previous Examples.

However, in the machine of this Example, the lower trim tool carries a web transfer member, typically of plate-like form. The web transfer member is able to move horizontally independently of the horizontal movement of the trim tool. The web transfer member is apertured to provide clearances as required for the action of the punch and other trimming components of the trimming tools.

Figure 13:
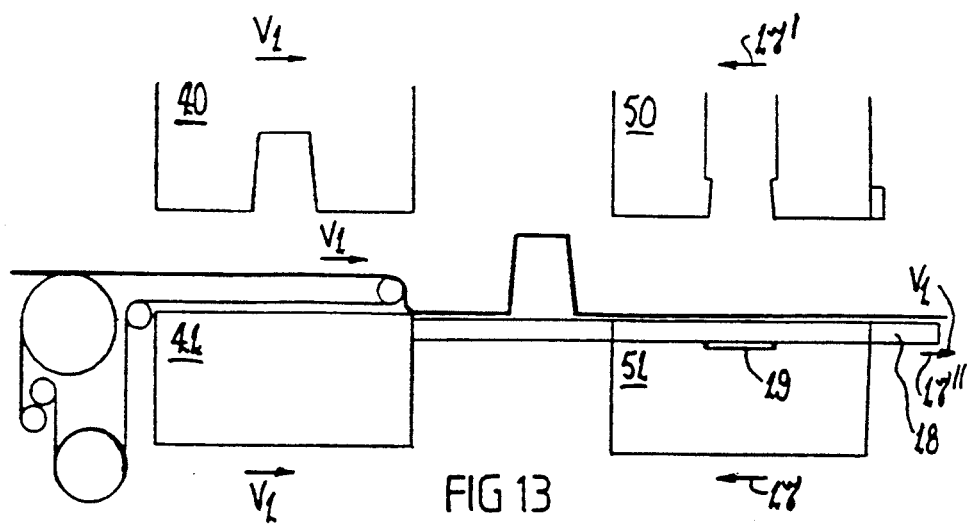
FIGS. 13 to 15 are schematic representations showing successive stages of the method and of the positions occupied by the apparatus of Example 6.
Figure 14:
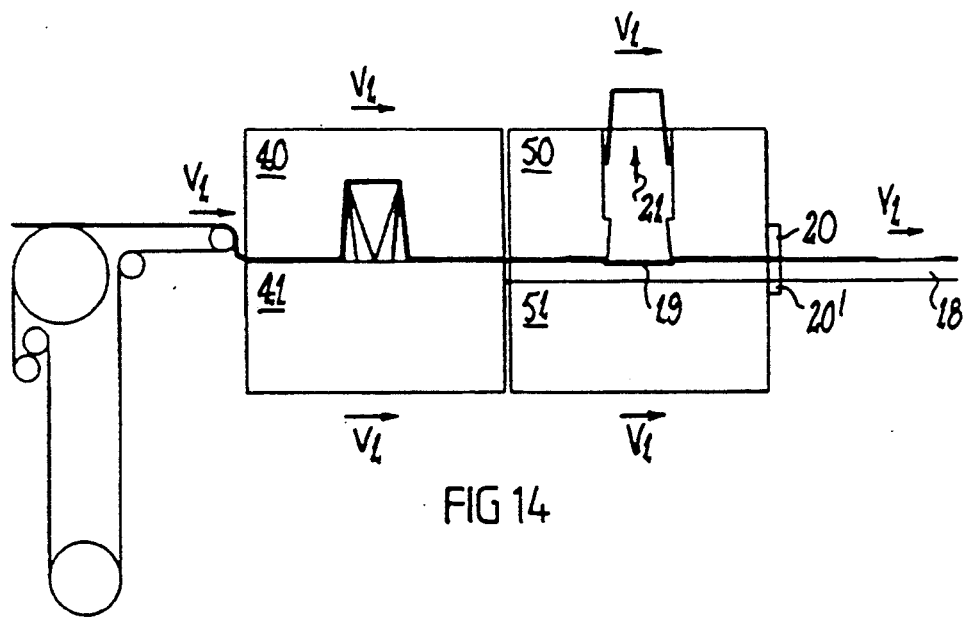
Figure 15:
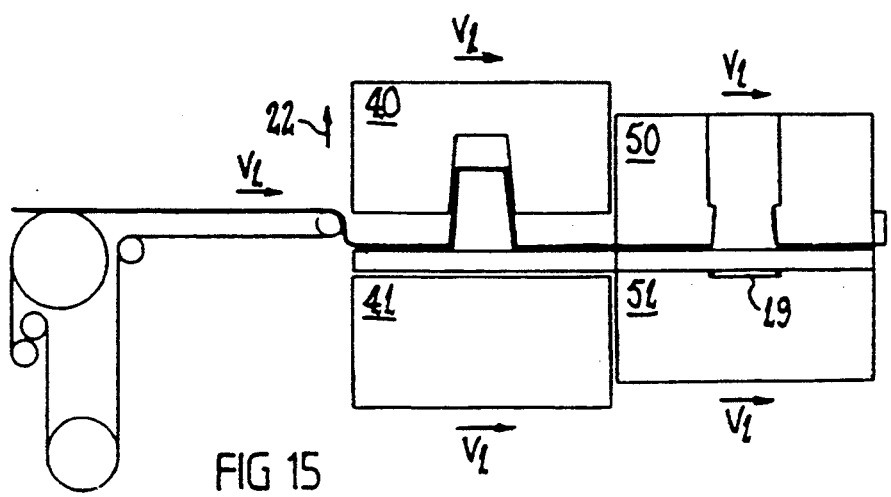

FIGS. 13 to 15 illustrate schematically several important stages in the operation of this machine. In FIG. 13, the trim tools 50 and 51 are retracting as indicated by arrows 17' and 17. However, web transfer member 18 continues forwardly at speed $V_1$ with the conveyor and the forming tools 40 and 41. The formed web is supported at this stage solely by the web transfer member 18. Retraction of the conveyor exit support roll 2 is about to commence and web 30 will be deposited progressively on forming tool 41 as it advances with forming tool 40 at speed $V_1$.

When trim tools 50 and 51 are fully retracted, they commence moving forwardly at speed $V_1$ with the forming tools and the conveyor. Trim tool 50 is lowered over the previous formed part and forming of a new part commences in forming tools 40 and 41. The punch member 19 of trim tool 51 is operated to separate the previously formed part from the web and eject it through trim tool 50.

FIG. 14 shows the ejection of the part through trim tool 50 (arrow 21) and the completion of the new part in forming tools 40 and 41. Knives 20 and 20' operate to sever the scrap from the web.

After cooling of the newly formed part has proceeded sufficiently in the forming tools, forming tool 41 is lowered and the web transfer member is retracted into the gap formed between the forming tools. In FIG. 15, the ejection of the newly formed part from forming tool 40 onto web transfer member 18 is shown. After ejection of the part, forming tool 40 is raised further as indicated by arrow 22 and the forming tools 40 and 41 are retracted together to recommence the cycle from FIG. 13.

The location of the web transfer member 18 on the trimming tools and the form of the web transfer member may obviously be varied provided the web transfer member can function to support the web without relative movement between them, while the forming and trimming tools are raised, lowered, advanced and retracted.

EXAMPLE 7

In this example, the machine illustrated has the same major components as the machine of Example 3 to 6. However, the use of additional components and alterations in the synchronized sequence of operations further show the versatility of the present invention. A significant additional component is the provision of means to sever the incoming web after the forming tools have closed. This allows a separated section of web to be subjected to the forming, cooling and trimming operations.

FIG. 16 shows incoming web 130 entering at web flow speed $V_1$. The incoming web is supported by the conveyor which is also moving at speed $V_1$ and the free end of the web extends over the conveyor exit support roll 102. Forming tools 140 and 141 have just completed a retraction movement at speed $V_2$ so as to lie above the extended conveyor. Transfer plate 118 carries formed web 170 towards the trim press comprising trimming tools 150 and 151. The operation and function of product removal tray 160 will be described shortly.

In FIG. 17, exit support roll 102 is being retracted so as to deposit web 130 on the lower forming tool 141. The forming tools are advancing together at the web flow speed $V_1$. Web transfer member 118 has moved into position in the trim press between trimming tools 150 and 151.

In FIG. 18, the retraction of exit support roll 102 has been completed and the web 130 covers the upper surface of forming tool 141. The forming tools continue to advance at web flow speed $V_1$. Trimming tools 150 and 151 are moving together to commence the trimming of formed web 170.

In FIG. 19, forming tools 140 and 141 have moved into registry and cutting tools 142 and 143 have cooperated to sever the incoming web so that the section of web enclosed by the forming tools is separate from the incoming web. Trimming tools 150 and 151 are also in registry so that the trimming of the formed web 170 is complete.

In FIG. 20, both the exit support roll 120 and the forming tools 140 and 141 are moving rapidly forward at speeds $V_3$ and $V_4$. Speeds $V_3$ and $V_4$ which may be the same or different are greater than the web flow speed $V_1$. As a result of the relatively rapid forward movement of the exit support roll 120, the newly formed leading end 131 of the incoming web is supported part way along the horizontal run portion of the conveyor. Trim tools 150 and 151 are separating with the upper trim tool 150 retaining the formed products 171 and 172 while the residual trimmed web remains on the web transfer member 118.

In FIG. 21, the exit support roll continues to move forwardly at speed $V_3$. Forming tools 140 and 141 are now stationary and are operating to form the separated section of web. Blades 144 from the male forming tool 141 are forcing the web upwardly into the female forming tool 140. Product handling member 160 is moving between trim tools 150 and 151.

In FIG. 22, exit support roll 120 continues to move forward at speed $V_3$ towards the stationary forming tools 140 and 141 in which the forming process has been completed and cooling of the formed web within forming tool 140 has commenced. Product handling member 160 is operating to pick up the trimmed web from transfer member 118 while products 171 and 172 are ejected from the other trim tool 150 onto product handling member 160.

In FIG. 23, forward movement of the exit support roll 120 has ceased, cooling of the formed web in forming tool 140 continues and retraction of the forming blades 144 is taking place. Product handling member 160 is moving away from the trim tools 150, 151 carrying the formed products 171 and 172 and the residual trimmed web 173, 174 and 175.

In FIG. 24, the leading end of the incoming web at 131 continues to move forwardly at web flow speed $V_1$ supported by the horizontal run portion of the conveyor. Cooling of the formed web continues in forming tool 140, residual web 173, 174 and 175 has been ejected from the product handling member 160 and products 171 and 172 are being removed.

In FIG. 25, the leading end at 131 of the incoming web has come closer to the exit support roll 120, cooling of the formed web in forming tool 140 continues, the products and the residual web portions have been removed from product handling member 160 and web transfer member 118 is being retracted from its position between trimming tools 150 and 151.

In FIG. 26, web transfer member 118 is moving into position beneath the formed web in forming tool 140.

In FIG. 27, the leading end at 131 of the incoming web has reached exit support roll 120, forming tool 140 has been lifted to deposit the formed web on web transfer member 118 and web transfer member 118 is supported by forming tool 141.

In FIG. 28, the leading end at 131 of the incoming web is moving over the exit support roll 120 while web transfer member 118 is moving forwardly towards trimming tools 150 and 151 carrying the formed web. The cycle of operations will shortly recommence with the various components at the positions shown in FIG. 16.

Figure 29:
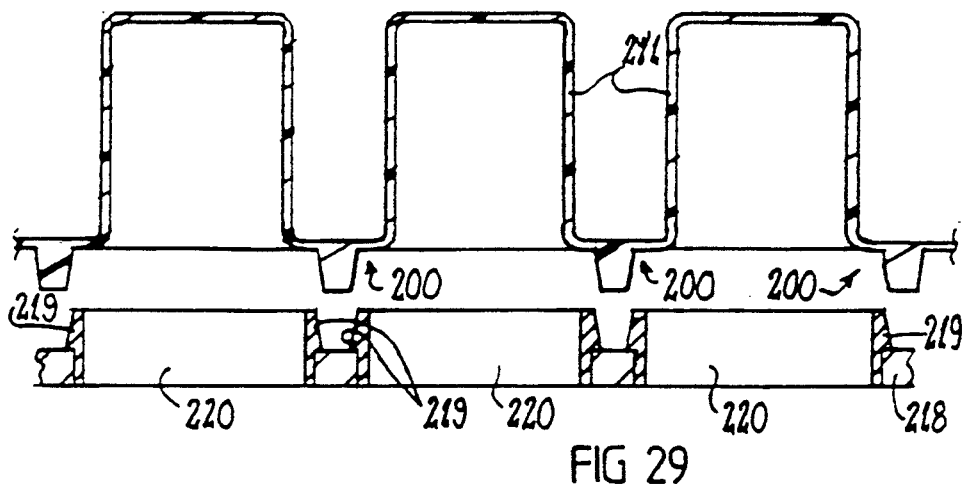
FIGS. 29 to 30 are schematic representations showing details of preferred constructions which may be used in trimming the formed sheet of this invention.
Figure 30:
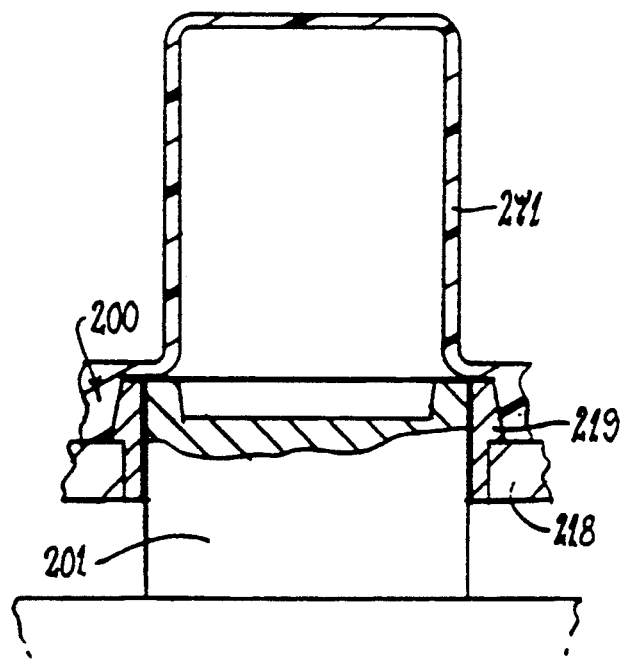

FIGS. 29 and 30 show the way in which a preferred form of construction of the web transfer member can be used in conjunction with a corresponding structure in the formed web to assist accurate location of the formed web for the trimming procedure. As shown, web transfer member 218 includes complementary raised locating features 219 which correspond in form and position to projections 200 which are formed in the formed web. The complementary locating features 219 may be tapered as shown or otherwise shaped to permit easy withdrawal of the locating features from the projections. The web transfer member 218 is formed with openings 220 through which punch elements 210 (FIG. 30) may extend during the trimming procedure.

It will be appreciated that various alterations, modifications and/or additions may be introduced into the constructions and arrangements of parts previously described without departing from the spirit or ambit of the invention.

We claim:

1. A method for the operation of a thermoforming machine in which successive sections of a thermoforming web are formed, the method comprising the steps of:

feeding a thermoformable web of plastics material into the entry of the thermoforming machine from an exit support roll of a substantially horizontal run portion of a conveyor, the exit support roll being movable forwardly in the direction of movement of the web and rearwardly in the opposite direction so as to respectively extend and retract the length of the horizontal run portion of the conveyor available to support the web, and synchronizing the movement of the conveyor with the web flow speed at which the web is deposited initially on the conveyor and with the movement of vertically opposed male and female forming tools which are part of the thermoforming machine and which are able to advance and retract horizontally respectively in and against the web movement direction and to move vertically perpendicular to their horizontal movement, wherein the exit support roll is retracted from a position at the forward end of the lower forming tool so as to deposit the web on the lower forming tool as the lower forming tool is moved forward at the web flow speed, the exit support roll and the lower forming tool are then moved forward at the web flow speed while the upper forming tool, also moving at the web flow speed, is brought into registry with the web and lower forming tool, the web is formed and cooled within the forming tools, the tools are then separated vertically and at least the lower tool is retracted.

2. The method as claimed in claim 1, wherein the respective forming tools are separated vertically to allow the conveyor to extend between them prior to deposition of the web on the lower forming tool.

3. The method as claimed in claim 1, wherein the formed web is trimmed after leaving the forming tools by trimming tools synchronized to cooperate with the movements of the conveyor and forming tools.

4. The method as claimed in claim 3, wherein the formed web is supported after removal from the forming tools and before the formed web enters the trimming tools.

5. The method as claimed in claim 4, wherein the formed web is held in the upper forming tool and a web transfer member is inserted between the forming tools and travels forward at web flow speed with the forming tools and trimming tools as the upper forming tool releases the web onto the web transfer member, the forming tools are then retracted together until the lower forming tool can be raised rearwardly of the web transfer member, the web is then deposited on the lower forming tool as the trimming tools are retracted together until the upper trimming tool can be lowered over the web on the web transfer member and the formed web is trimmed as the next succeeding section of the web is formed between the forming tools.

6. The method as claimed in claim 1, wherein the web is severed as it leaves the exit support roll so as to separate the incoming unformed web from a section of web to be formed, and the forming tools and the exit support roll are then extended forwardly more rapidly than the web flow speed.

7. The method as claimed in claim 6, wherein the section of web to be formed is formed and cooled in the forming tools, the forming tools are then separated vertically and a web transfer member is inserted between the tools, and the formed web is then ejected from the upper tool onto the transfer member.

8. The method as claimed in claim 7, wherein the transfer member carries the formed web to a trim press in which the formed web is trimmed.

9. A thermoforming system comprising:

a conveyor for continuously feeding thermoformable web;

a thermoforming machine having vertically opposed male and female forming tools which are able to advance and retract respectively in and against the direction of movement of the web through the machine and to move vertically perpendicular to their horizontal movement;

an exit support roll terminating a substantially horizontal run portion of the conveyor and movable forwardly in the web movement direction and rearwardly in the opposite direction so as to respectively extend and retract the length of the substantially horizontal run portion of the conveyor available to support the web, wherein the conveyor can be retracted from a position between the forming tools so as to deposit web extending rearwardly from the horizontal run portion on the upper surface of the lower forming tool, and the forming tools can be brought into registry by lowering the upper forming tool after retraction of the conveyor from between them to form the deposited web.

10. The thermoforming system as claimed in claim 9, wherein cutting tools are located and operable to sever the incoming unformed web as it leaves the exit support roll.

11. The thermoforming system as claimed in claim 9, or claim 10, wherein the thermoforming machine is adjacent to a trim press including trimming tools the operation of which is synchronised with the operation of the forming tools whereby formed web from the forming tools is passed directly from the thermoforming machine to the trim press.

12. The thermoforming system as claimed in claim 11, wherein a web transfer member movable between the thermoforming machine and the trim press is adapted to receive the formed web from the forming tools, and to support it between the forming tools and the trim press without relative movement between the web and the transfer member while the forming tools and trimming tools are raised, lowered, advanced and retracted.

13. The thermoforming system as claimed in claim 12, wherein the web transfer member is formed with locating features complementary with locating features formable in the web whereby the formed web can be accurately positioned on the web transfer member.

* * * * *